United States Patent Office 2,996,386
Patented Aug. 15, 1961

2,996,386
METHOD OF PROCESSING FISH
Ezra Levin, 1109 W. University, Champaign, Ill.
No Drawing. Filed Jan. 8, 1959, Ser. No. 785,578
4 Claims. (Cl. 99—111)

This invention relates to a method for processing fish and in particular to a method of comminuting fish into a form suitable for extracting the various nutrients therefrom.

It has been found that in order to completely and efficiently extract the various nutrients and other constituents from fish, it is necessary to grind or comminute the fish before further processing.

For example, in the azeotropic processing such as is disclosed in my Patent 2,503,313, it is necessary that the fish be ground to small particles, or preferably a pulpable mass, so that the solvent will efficiently extract the desired components.

However, it has been found that most fish are extremely difficult to grind due to their tough skins. Grinders and pumps wear out rapidly. The collagenous skin, even when finely ground, will stop the impellers of pumps or cause them to break. Generally, the skin or protective covering of fish is elastic, tough and flexible. It will not easily cut or fracture. This is true for fish with thin or thick skins; fish such as the shark family are more resistant to grinding than the herring family. It is almost impossible to grind members of the starfish family in raw state. The skin of fish is similar to the hides of other animals in that it includes collagen, or the collagen like protein, ossein.

Collagen, by way of definition, is an albuminoid, which is the major constituent of the white fiber in the connective tissues of the animal body, particularly in the skin, bones, and tendons. These tissues are by nature elastic, flexible, and sinewy, and, as a result, resist grinding and comminuting. In fact, many times they will wind around the moving parts of the comminuting machine to an extent that the operation of the machine is interrupted.

Briefly stated, the invention may be characterized as treating the collagenous tissues of certain animals, especially fish, so that the collagen is at least partially converted to gelatin, after which it is then ground or comminuted into suitable sized chunks or pieces for further processing.

It has been discovered that by subjecting the collagenous tissue of animals, especially fish, to treatment by a water solution at a temperature and for a time sufficient to convert at least part of the collagen in the tissues into gelatin without removing the skin, the gelatinized tissue is readily broken up by the action of a grinding machine.

As used in the specification and claims, by fish is generally meant all animal sea life which have large portions of collagenous tissue, particularly skin, which makes it difficult to comminute in the ordinary manner, including crustaceans and mollusks. It should be pointed out that my inventive process is not to be confused with the prior processes for removing skins of fish which immerse the fish in boiling water for purposes of removing the skin, rather than for converting the collagen to gelatin. In fact, removing the skin in water is undesirable, since this adds undesirable moisture to the tissues.

The raw whole fish may be used in the whole state, or may be eviscerated, so as to remove the entrails along with any other parts such as the head and fins, and may be processed whole, or cut into large chunks, depending upon its size and type. The raw fish is then subjected to treatment in water, preferably at least 40° C. for a time sufficient to at least partially convert the collagenous tissue therein to gelatin, without removing the skin. It has been found that for water at 40° C., 3 minutes is generally sufficient; that for water at 60° C., 20 seconds is generally sufficient; and for higher temperatures, less time is required. Subjecting the fish to steam for a few seconds can accomplish the same result. These time periods, however, are merely illustrative and vary considerably with the species involved, size of fish or chunks, as well as other factors. It should be pointed out that boiling water, or steam at atmospheric pressures, may be used in certain instances in the practice of my invention. The pressures employed are atmospheric.

The water solution may have a pH in the range from about 1 to about 7, and is preferably acidic. Acidic solutions, for instance at a pH in the range from about 2 to about 6, permit the use of lower temperatures and shorter time periods. Any acids which lower the pH are suitable that do not deleteriously affect the product, although some acids are not equivalent to others. Suitable acids include the mineral acids, for example, sulfuric, phosphoric, hydrochloric, sulfurous acid, and the like.

After the fish has been subjected to the hot water solution treatment for a time sufficient to at least partially convert the collagenous tissue to gelatin, but not long enough to remove the skin, it is then placed in a grinder, or hammermill for reducing it to relatively small pieces or particles. The converted collagenous tissue is sufficiently weak and soft to be readily torn or broken up by the comminuting machine to a particle size sufficiently small to allow permeation by solvent in the solvent treatment operation, usually to a size less than 0.5 inch in diameter. A "Rietz" pre-breaker, for example, may be employed in the grinding operation. After the fish has been ground or comminuted, it may then be defatted and dehydrated by treatment with a low boiling point organic solvent.

Organic solvents that may be used in the defatting-dehydrating step include chlorinated aliphatic hydrocarbons, for example, dichloroethane, propylene dichloride, trichloroethylene, and the like. These organic solvents not only have required characteristics of a low boiling point, for example, less than 100° C., but also produces azeotropes with water which will remove substantial quantities of water per unit weight of solvent, so that the dehydration can be carried out at reasonable costs. The defatting-dehydrating operation may be carried out by addition of the comminuted fish to a distillation vessel containing the organic solvent. The system is gradually heated until the distillation begins, and this may be accomplished under reduced pressures. Distillation is continued until the fat and water are substantially removed.

Excess solvent, above that required to completely remove the water by azeotropic distillation, is maintained in the distillation vessel. This is accomplished either by adding requisite amounts of solvents at the time the distillation is started, or by continuously replenishing the solvent removed during distillation.

At the completion of the distillation operation, the mixture is withdrawn from the vessel, and the dehydrated-defatted residue is separated from the solvent. The resulting powder may then be further treated, if desired, to improve the product.

In order to further illustrate the invention, the following examples are given, which are not intended to limit the scope thereof:

*Example I*

Ten pounds of shark were cut up in large chunks and immersed in water at a temperature of 40° C. for three minutes. During this time the skin became soft and pliable. The chunks were next ground in a hammermill grinder to a particle size less than 0.5 inch in diameter. Subsequently, the comminuted shark was dehydrated and defatted by distilling in a solution of heptane.

*Example II*

Ten pounds of shark were cut up in chunks and treated with steam for 5 seconds at atmospheric pressures. During this time the skin was denatured. Next the chunks were ground in a "Rietz" pre-breaker to less than 0.5 inch in diameter, and subsequently dehydrated and defatted by distilling in dichloroethane.

*Example III*

Starfish cannot be ground satisfactorily in the hammermills, or grinders, ordinarily used. This was attempted in a "Rietz" pre-breaker and the starfish stopped the machine.

Starfish immersed in water, 50° C. for 30 seconds, converted the collagenous skin to a condition permitting grinding with practically no load on the same grinder. Starfish subjected to steam for 2 seconds acted in a similar manner.

Other modes of applying the principle of the invention may be employed, change being made as regards the details described, provided the features stated in any of the following claims or the equivalent of such be employed.

I, therefore, particularly point out and distinctly claim as my invention:

1. A method for processing fish comprising, subjecting the fish to a treatment with water at a temperature of at least 40° C. at atmospheric pressure and for a maximum time of about three minutes sufficient to at least partially convert the collagenous tissue to gelatin without removing the skin, said water having a pH in the range from about 1 to about 7, and comminuting the fish to a size particle suitable for further processing.

2. The method of claim 1 in which said water has a pH in the range from about 2 to about 6.

3. A method for processing fish comprising eviscerating the fish, subjecting the fish to a water solution of a temperature in the range from about 40° C. to about 60° C. for a time in the range from about three minutes to about twenty seconds sufficient to at least partially convert the collagenous tissue to gelatin without removing the skin, said water solution having a pH in the range from about 1 to about 7, and comminuting the fish to a size particle suitable for further processing.

4. The method of claim 3 in which said water solution has a pH in the range from about 2 to about 6.

References Cited in the file of this patent

UNITED STATES PATENTS

| | | |
|---|---|---|
| 2,503,312 | Worsham et al. | Apr. 11, 1950 |

FOREIGN PATENTS

| | | |
|---|---|---|
| 197,729 | Great Britain | May 15, 1923 |
| 332,241 | Great Britain | July 16, 1930 |